United States Patent
Guo et al.

(10) Patent No.: US 11,865,934 B2
(45) Date of Patent: Jan. 9, 2024

(54) ELECTRIC VEHICLE, AND INTEGRATED CONTROLLER AND INTEGRATED CONTROL SYSTEM THEREOF

(71) Applicant: BYD COMPANY LIMITED, Guangdong (CN)

(72) Inventors: Caifang Guo, Shenzhen (CN); Pengfei Yao, Shenzhen (CN); Axi Qi, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 81 days.

(21) Appl. No.: 17/628,690

(22) PCT Filed: Aug. 5, 2020

(86) PCT No.: PCT/CN2020/107059
§ 371 (c)(1),
(2) Date: Jan. 20, 2022

(87) PCT Pub. No.: WO2021/027648
PCT Pub. Date: Feb. 18, 2021

(65) Prior Publication Data
US 2022/0314824 A1  Oct. 6, 2022

(30) Foreign Application Priority Data
Aug. 15, 2019 (CN) .......................... 201910754912.0

(51) Int. Cl.
*B60L 53/22* (2019.01)
*B60L 15/04* (2006.01)
(Continued)

(52) U.S. Cl.
CPC ............... *B60L 53/22* (2019.02); *B60L 15/04* (2013.01); *B60L 53/11* (2019.02); *H02J 7/0013* (2013.01);
(Continued)

(58) Field of Classification Search
None
See application file for complete search history.

(56) References Cited

U.S. PATENT DOCUMENTS

| | | | |
|---|---|---|---|
| 9,493,088 B2 | 11/2016 | Wei et al. | |
| 2016/0152151 A1* | 6/2016 | Yang | B60L 53/22 320/109 |
| 2020/0298722 A1* | 9/2020 | Smolenaers | H02J 7/345 |

FOREIGN PATENT DOCUMENTS

| | | |
|---|---|---|
| CN | 102684248 A | 9/2012 |
| CN | 102826054 A | 12/2012 |

(Continued)

OTHER PUBLICATIONS

International Search Report and Written Opinion for Application No. PCT/CN2020/107059, dated Oct. 29, 2020, 11 pages.

*Primary Examiner* — Jared Fureman
*Assistant Examiner* — Aqeel H Bukhari

(57) ABSTRACT

The present disclosure relates to the technical field of vehicles, and provides an electric vehicle and an integrated controller and an integrated control system therefor. The integrated controller includes: a first control chip, including a first core and a second core, where the first core is configured to control an electronic control module to drive a motor, and the second core is used as a vehicle controller; and a second control chip, configured to control an on-board charging module, so that an external AC power supply realizes AC charging for a power battery, or the power battery realizes AC discharging to an external load through an AC charging and discharging port.

20 Claims, 11 Drawing Sheets

(51) Int. Cl.
*B60L 53/10* (2019.01)
*H02J 7/02* (2016.01)
*H02J 7/00* (2006.01)
*H02M 7/5387* (2007.01)
*H02M 3/335* (2006.01)

(52) U.S. Cl.
CPC .............. *H02J 7/0063* (2013.01); *H02J 7/02* (2013.01); *H02M 3/33571* (2021.05); *H02M 7/5387* (2013.01)

(56) References Cited

FOREIGN PATENT DOCUMENTS

| | | |
|---|---|---|
| CN | 202952843 U | 5/2013 |
| CN | 104802658 A | 7/2015 |
| CN | 105790337 A | 7/2016 |
| CN | 205375053 U | 7/2016 |
| CN | 106004489 A | 10/2016 |
| CN | 106143175 A | 11/2016 |
| CN | 106292444 A | 1/2017 |
| CN | 106452279 A | 2/2017 |
| CN | 107128159 A | 9/2017 |
| CN | 207128660 U | 3/2018 |
| CN | 107933377 A | 4/2018 |
| CN | 207926248 U | 9/2018 |
| CN | 208216510 U | 12/2018 |
| EP | 2821274 A2 | 1/2015 |
| JP | 2012-157082 A | 8/2012 |
| JP | 2015-122940 A | 7/2015 |

\* cited by examiner

ELECTRIC VEHICLE, AND INTEGRATED CONTROLLER AND INTEGRATED CONTROL SYSTEM THEREOF

CROSS-REFERENCE TO RELATED APPLICATIONS

This application is a National Phase Application of International Patent Application No. PCT/CN2020/107059, filed on Aug. 5, 2020, which is based on and claims priority to and benefits of Chinese Patent Application 201910754912.0, entitled "ELECTRIC VEHICLE AND INTEGRATED CONTROLLER AND INTEGRATED CONTROL SYSTEM THEREOF" and filed on Aug. 15, 2019. The entire content of all of the above identified applications is incorporated herein by reference.

FIELD

The present disclosure relates to the technical field of vehicles, and in particular, to an electric vehicle, and an integrated controller and an integrated control system therefor.

BACKGROUND

Currently, developments of the parts of electric vehicles are toward high integration, low costs, and small sizes. However, in the related art, physical integration is used in most cases, that is, different parts and components are directly assembled. Therefore, cost and volume reduction proportions are limited.

SUMMARY

An objective of the present disclosure is to at least resolve one of the technical problems in the related art to some extent.

To this end, the present disclosure is intended to provide an integrated controller for an electric vehicle, to reduce required electrical elements by sharing or reusing electrical elements, thereby reducing the costs and the size and the weight of the assembly.

The present disclosure is further intended to provide an integrated control system for an electric vehicle.

The present disclosure is still further intended to provide an electric vehicle.

In order to achieve the above objective, an embodiment of a first aspect of the present disclosure provides an integrated controller for an electric vehicle. The electric vehicle includes a power battery and an alternating current (AC) charging and discharging port. The integrated controller includes: a first control chip, including a first core and a second core, where the first core is configured to control an electronic control module to drive a motor, and the second core is used as a vehicle controller; and a second control chip, configured to control an on-board charging module, so that an external AC power supply realizes AC charging for the power battery, or the power battery realizes AC discharging to an external load through the AC charging and discharging port.

According to the integrated controller for an electric vehicle in this embodiment of the present disclosure, the control chips are shared, so that required elements can be reduced, thereby reducing the costs and the size and the weight of the assembly.

In order to achieve the above objective, the present disclosure is further intended to provide an integrated control system for an electric vehicle. The electric vehicle includes a power battery and an AC charging and discharging port. The integrated control system includes: the integrated controller for an electric vehicle according to the above embodiment, where the integrated controller includes a first control chip and a second control chip, and where the first control chip includes a first core and a second core; and a driving unit, including an electronic control module, a motor, and an on-board charging module, where the first core is configured to control the electronic control module to drive the motor, the second core is used as a vehicle controller, and the second control chip is configured to control the on-board charging module, so that an external AC power supply realizes AC charging for the power battery, or the power battery realizes AC discharging to an external load through the AC charging and discharging port.

According to the integrated control system for an electric vehicle in this embodiment of the present disclosure, the electrical elements are shared or reused, so that required electrical elements can be reduced, thereby reducing the costs and the size and the weight of the assembly.

In order to achieve the above objective, an embodiment of a third aspect of the present disclosure provides an electric vehicle. The electric vehicle includes the above integrated control system for an electric vehicle.

According to the electric vehicle in this embodiment of the present disclosure, the integrated control system for an electric vehicle in the above embodiment is used, and the electrical elements are shared or reused, so that required electrical elements can be reduced, thereby reducing the costs and the size and the weight of the assembly.

The additional aspects and advantages of the present disclosure will be provided in the following description, some of which will become apparent from the following description or may be learned from practices of the present disclosure.

BRIEF DESCRIPTION OF THE DRAWINGS

The foregoing and/or additional aspects and advantages of the present disclosure will become apparent and comprehensible in the description made with reference to the following accompanying drawings.

DETAILED DESCRIPTION

The embodiments of the present disclosure are described below in detail. Examples of the embodiments are shown in the accompanying drawings, and same or similar reference signs in all the accompanying drawings indicate same or similar components or components having same or similar functions. The embodiments described below with reference to the accompanying drawings are exemplary, and are intended to explain the present disclosure, but should not be construed as limiting the present disclosure.

An electric vehicle, and an integrated controller and an integrated control system therefor according to the embodiments of the present disclosure are described below with reference to the drawings.

Figure 1:
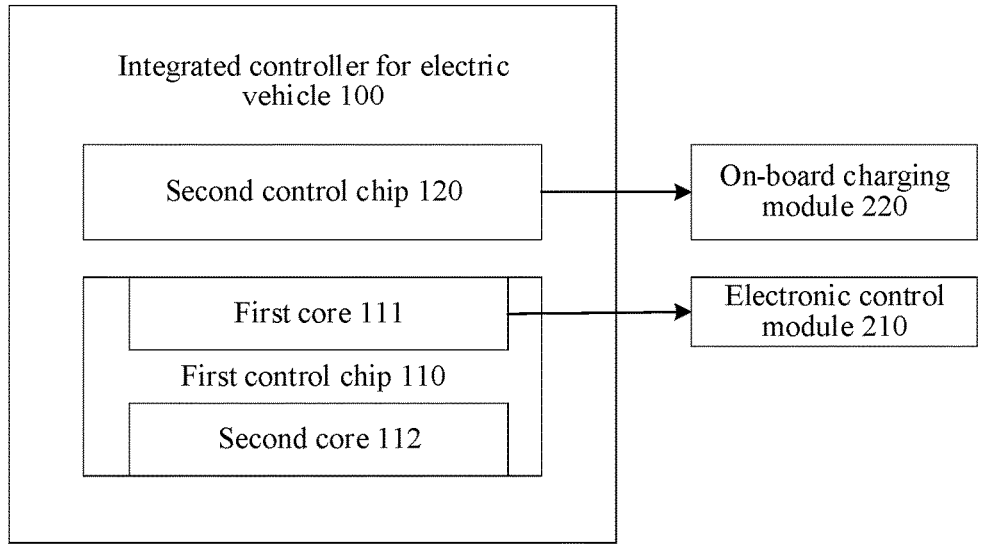
FIG. 1 is a structural block diagram of an integrated controller for an electric vehicle according to an embodiment of the present disclosure.

FIG. 1 is a structural block diagram of an integrated controller for an electric vehicle according to an embodiment of the present disclosure.

In this embodiment, the electric vehicle includes a power battery and an AC charging and discharging port. The AC charging and discharging port may be configured to be connected to an external AC power supply or an external load.

Referring to FIG. 1, an integrated controller 100 for an electric vehicle includes a first control chip 110 and a second control chip 120. The first control chip 110 includes a first core 111 and a second core 112. The first core 111 is configured to control an electronic control module 210 to drive a motor M, and the second core 112 is used as a vehicle controller of the electric vehicle. The second control chip 120 may include one core. The second control chip 120 is configured to control an on-board charging module 220, so that the external AC power supply realizes AC charging for the power battery, or the power battery realizes AC discharging to the external load.

According to the integrated controller 100 for an electric vehicle, the control chips are shared, so that the costs and the size and the weight of the assembly can be reduced.

In an embodiment, a direct current (DC) terminal of the electronic control module 210 is connected to the power battery, an AC terminal of the electronic control module 210 is connected to the motor M, a first DC terminal of the on-board charging module 220 is connected to the power battery, and an AC terminal of the on-board charging module 220 is connected to the AC charging and discharging port. The first core 111 is configured to control the electronic control module 210, the power battery is configured to supply power to the motor M to drive the motor, and the second core 112 is used as the vehicle controller of the electric vehicle and for vehicle control. The second control chip 120 can control the on-board charging module 220 alone, so that the external AC power supply realizes AC charging for the power battery, or the power battery realizes AC discharging to the external load.

In an embodiment, the electric vehicle further includes a low-voltage battery. The low-voltage battery is connected to a second DC terminal of the on-board charging module 220. The second control chip 120 is further configured to control the on-board charging module 220, so that the power battery realizes charging for the low-voltage battery.

It should be understood that, the low-voltage battery is configured to supply power to a low-voltage load of the vehicle.

Figure 2:
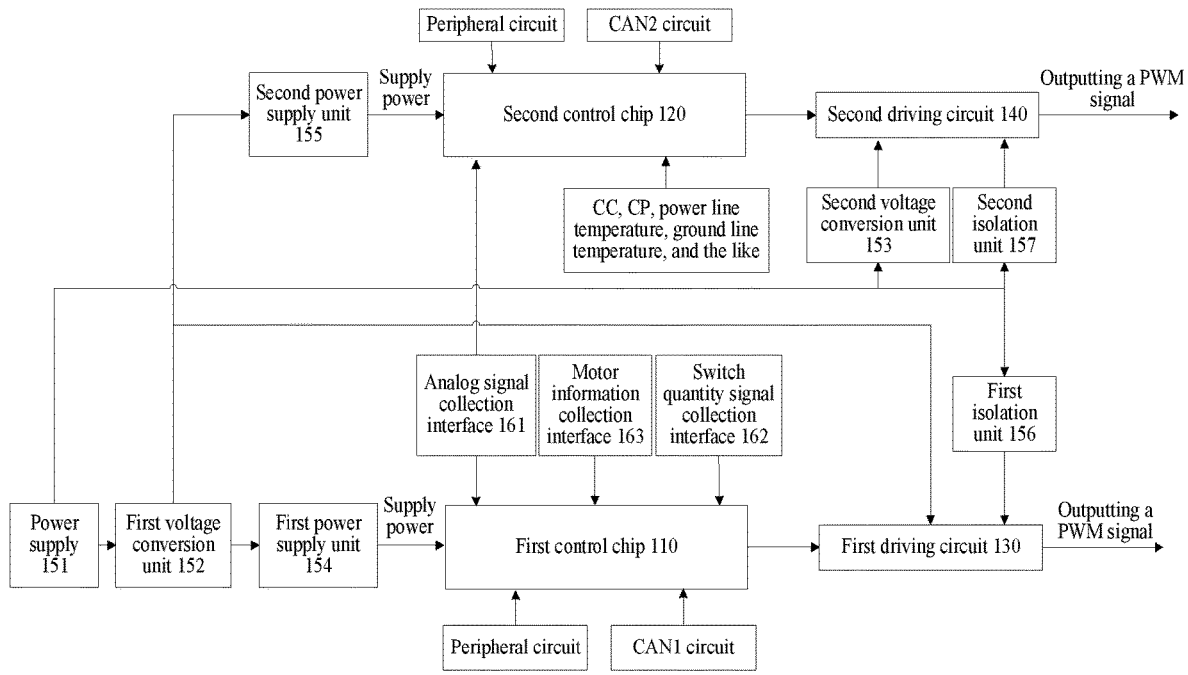
FIG. 2 is a structural block diagram of an integrated controller for an electric vehicle according to a specific example of the present disclosure.

In an embodiment, as shown in FIG. 2, the integrated controller 100 further includes a first driving circuit 130 and a second driving circuit 140. The first driving circuit 130 is connected to the first control chip 110, the second driving circuit 140 is connected to the second control chip 120, and the first control chip 110, the second control chip 120, the first driving circuit 130, and the second driving circuit 140 share a power module. The first driving circuit 130 is configured to drive the electronic control module 210, and the second driving circuit 140 is configured to drive the on-board charging module 220.

Referring to FIG. 2, the shared power module includes a power supply 151, a first voltage conversion unit 152, a second voltage conversion unit 153, a first power supply unit 154, a second power supply unit 155, a first isolation unit 156, and a second isolation unit 157. The power supply 151 is connected to the first voltage conversion unit 152, the second voltage conversion unit 153, the first isolation unit 156, and the second isolation unit 157. The first voltage conversion unit 152 is connected to the first power supply unit 154, the second power supply unit 155, and the first driving circuit 130. The first isolation unit 156 is connected to the first driving circuit 130. The second voltage conversion unit 153 is connected to the second driving circuit 140. The second isolation unit 157 is connected to the second driving circuit 140. The first power supply unit 154 is connected to the first control chip 110. The second power supply unit 155 is connected to the second control chip 120.

The power supply 151 can provide a 12V voltage, the first voltage conversion unit 152 and the second voltage conversion unit 153 both can be configured to convert the 12V voltage to a 5V voltage, and the first isolation unit 156 and the second isolation unit 157 both can be configured to provide 12V isolated power. Therefore, the present disclosure can realize power supply to all control chips and driving circuits by using only one circuit board (that is, only one set of power supply). Compared with the related that in which controllers and driving circuits each require one set of power supply, the power supply mode in the present disclosure uses fewer devices, lower costs, and a smaller assembly volume and weight.

In an embodiment, referring to FIG. 2, the integrated controller 100 further includes an analog signal collection interface 161. The first control chip 110 and the second control chip 120 are both connected to the analog signal collection interface 161. An analog signal includes one or more of a throttle signal, a brake signal, an atmospheric pressure signal, a vacuum pressure signal, a current signal, a voltage signal, or temperature information. Therefore, one signal collection interface may be disposed for one type of analog signal. The signal collection interface is connected to the first control chip 110 and the second control chip 120.

Referring to FIG. 2, the integrated controller 100 further includes a switch quantity signal collection interface 162 and a motor information collection interface 163 connected to the first control chip 110. The first core 111 and the second core 112 share a switch quantity signal collected by the switch quantity signal collection interface 162 and motor position information collected by the motor information collection interface 163.

In an embodiment, the electric vehicle further includes a DC charging and discharging port. The DC charging and discharging port may be configured to be connected to the external DC power supply or the external load. The first core 111 is further configured to control the electronic control module 210, so that the external DC power supply realizes boost DC charging for the power battery, or the power battery realizes DC discharging to the external load through the DC charging and discharging port.

In the embodiment, a first port of the DC charging and discharging port is connected to a first electrode of the power battery by the motor M and the electronic control module 210 successively, and a second port of the DC charging and discharging port is connected to a second electrode of the power battery.

Figure 3:
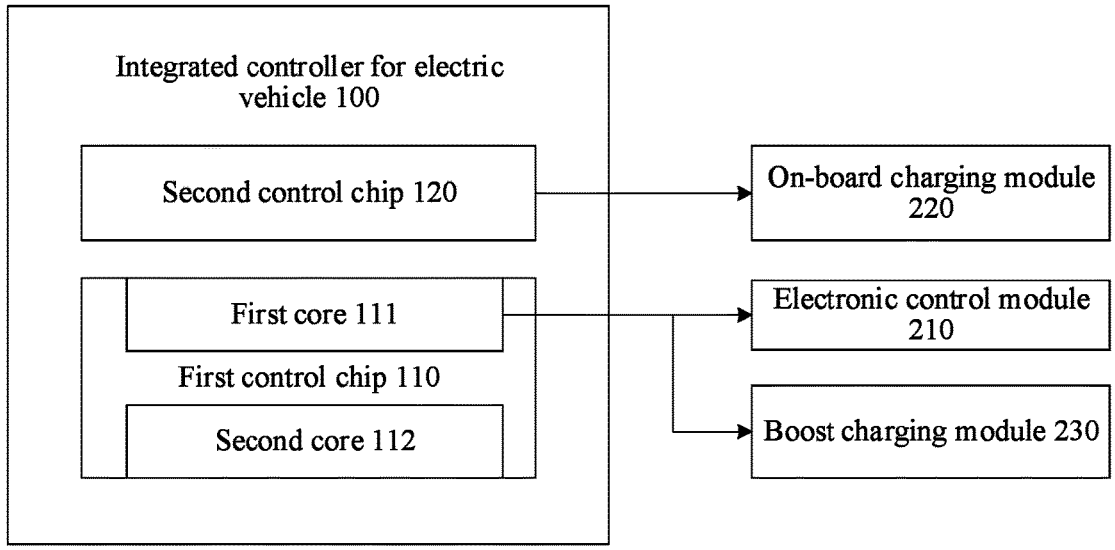
FIG. 3 is a structural block diagram of an integrated controller for an electric vehicle according to another embodiment of the present disclosure.

In an embodiment, the electric vehicle further includes a DC charging and discharging port. The DC charging and discharging port may be configured to be connected to the external DC power supply or the external load. A boost charging module 230 is disposed between the DC charging and discharging port and the power battery. As shown in FIG. 3, the first core 111 is further configured to control the boost charging module 230, so that the external DC power supply realizes boost DC charging for the power battery, or the power battery realizes DC discharging to the external load through the DC charging and discharging port.

In an embodiment, the first core 111 and the second control chip 120 may be configured to operate simultaneously. The first core 111 is configured to control the electronic control module 210, and the second control chip 120 is configured to control the on-board charging module 220, so that the external AC power supply realizes AC charging for the power battery, or the power battery realizes AC discharging to the external load through the AC charging and discharging port.

In the embodiment, a first port of the AC charging and discharging port is connected to the electronic control module 210 by the motor M, a second port of the AC charging and discharging port is connected to the on-board charging module 220, and the electronic control module 210 is connected to the on-board charging module 220.

The control function of the integrated controller 100 is described below by using some operating conditions.

Operating condition I (operation of motor M):

The corresponding analog signal collection interface 161 collects voltage information, current information, and the like of the motor M, the motor information collection interface 163 collects motor position information, and the first core 111 generates a driving control signal according to the motor position information, the voltage information, and the current information, and causes, by using the first driving circuit 130 according to the driving control signal, the motor M to operate.

Operating condition II (collision of the electric vehicle):

The switch quantity signal collection interface 162 collects collision information, the motor information collection interface 163 collects motor position information (used to calculate a vehicle speed), and the first core 111 generates a control command according to the collision information and the vehicle speed information, and executes a three-phase short-circuit policy or a six-phase open-circuit policy according to the control command, to control the electronic control module 210 to stop operation of the motor M. When the vehicle speed is higher than a vehicle speed threshold (for example, 60 KW/h), the first core 111 may execute the three-phase short-circuit policy. When the vehicle speed is lower than the vehicle speed threshold, the first control chip 110 may execute the six-phase open-circuit policy. It should be noted that, a different vehicle speed threshold may be set for a different electric vehicle.

Since a hard wired switch quantity signal collection interface 162 has a high collection speed, the switch quantity signal collection interface 162 is directly connected to the first core 111. Therefore, the collision information is not required to be acquired from the vehicle controller (that is, the second core 112), avoiding an information transmission delay. In this way, the response speed is high, so that the emergency brake is more safe.

Operating condition III (DC charging):

The corresponding analog signal collection interface 161 collects voltage information and current information, and the first control chip 110 generates a DC charging control signal according to the voltage information and current information, and controls, according to the DC charging control signal, the electronic control module 210 or the boost charging module 230 to operate, so that the external DC power supply realizes boost DC charging for the power battery.

Operating condition IV (AC charging and discharging):

The corresponding analog signal collection interface 161 collects voltage information and current information, a charger information collection module collects charger charging information, and the second control chip 120 generates an AC charging and discharging control instruction according to the voltage information, the current information, and the charger charging information, and controls, according to the AC charging and discharging control instruction, the on-board charging module 220 to operate, so that the external AC power supply realizes AC charging and discharging for the power battery.

Operating condition V (charging of low-voltage battery):

The corresponding analog signal collection interface 161 collects voltage information and current information, where the voltage information includes voltage information of the power battery side and voltage information of the low-voltage battery side, the second control chip 120 generates a buck control signal according to the voltage information of the power battery side, the voltage information of the low-voltage battery side, and the current information, and controls, according to the buck control signal, the on-board charging module 220 to operate, so that the power battery realizes charging for the low-voltage battery.

In conclusion, according to the integrated controller for an electric vehicle in this embodiment of the present disclosure, the control chips are shared, and the power module and the same signal collection interface are reused, so that required elements can be reduced, thereby reducing the costs and the size and the weight of the assembly.

Figure 4:
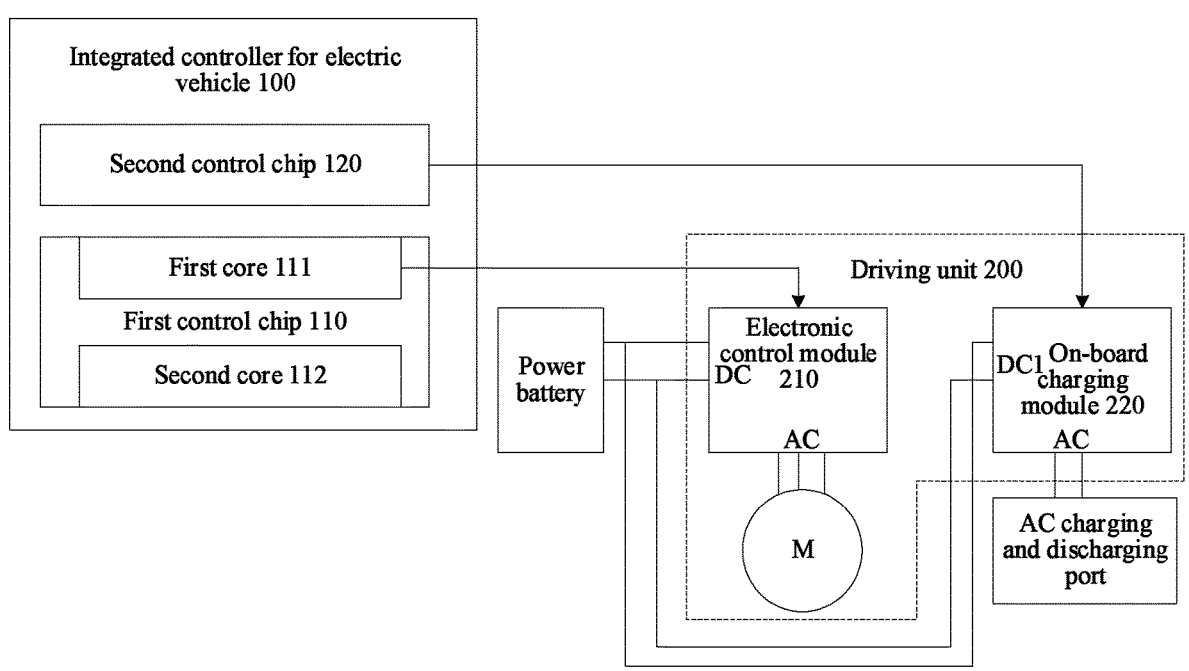
FIG. 4 is a structural block diagram of an integrated control system for an electric vehicle according to a first embodiment of the present disclosure.

FIG. 4 is a structural block diagram of an integrated control system for an electric vehicle according to an embodiment of the present disclosure.

In this embodiment, as shown in FIG. 4, the electric vehicle includes a power battery and an AC charging and discharging port. The AC charging and discharging port is configured to be connected to an external AC power supply or an external load. The integrated control system includes the integrated controller 100 and the driving unit 200 of the electric vehicle in the above embodiment.

Referring to FIG. 4, the integrated controller 100 includes a first control chip 110 and a second control chip 120, the first control chip 110 includes a first core 111 and a second core 112, and the driving unit 200 includes an electronic control module 210, a motor M, and an on-board charging module 220. The first core 111 is configured to control the electronic control module 210 to drive the motor M, and the second core 112 is used as a vehicle controller. The second control chip 120 is configured to control the on-board charging module 220, so that the external AC power supply realizes AC charging for the power battery, or the power battery realizes AC discharging to the external load through the AC charging and discharging port.

According to the integrated control system for an electric vehicle, the above integrated controller is used, and the control chips are shared, so that required elements can be reduced, thereby reducing the costs and the size and the weight of the assembly.

In an embodiment, referring to FIG. 4, a DC terminal of the electronic control module 210 is connected to the power battery, the motor M is connected to an AC terminal of the electronic control module 210, a first DC terminal of the on-board charging module 220 is connected to the power battery, and an AC terminal of the on-board charging module 220 is connected to the AC charging and discharging port.

Figure 5:
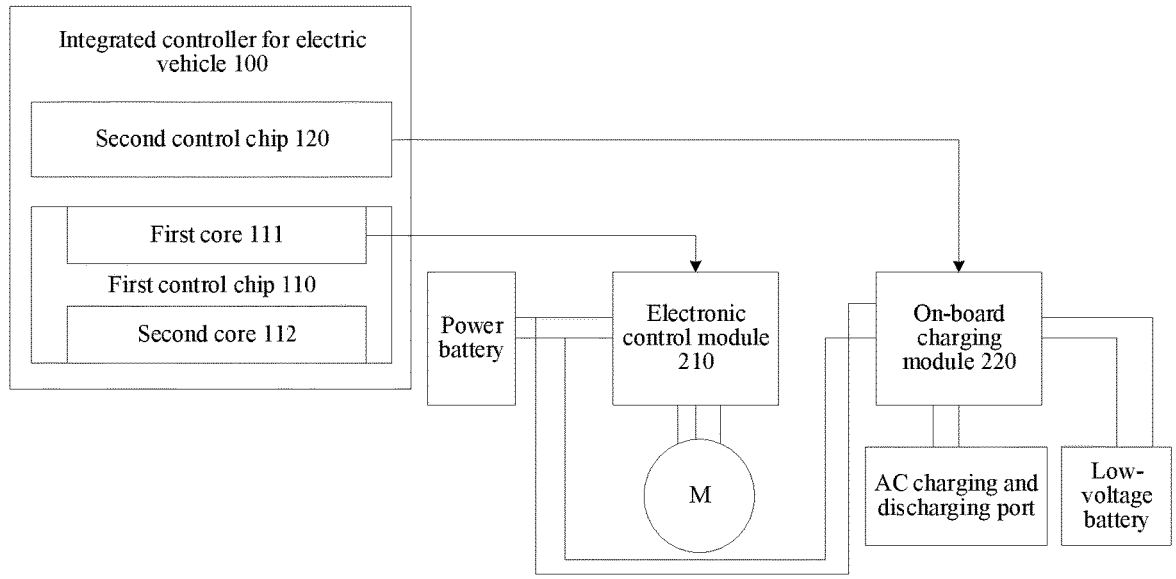
FIG. 5 is a structural block diagram of an integrated control system for an electric vehicle according to a second embodiment of the present disclosure.

In an embodiment, referring to FIG. 5, the electric vehicle further includes a low-voltage battery. The second control chip 120 is further configured to control the on-board charging module 220, so that the power battery realizes charging for the low-voltage battery.

Referring to FIG. 5, the AC terminal of the on-board charging module 220 is connected to the AC charging and discharging port, the first DC terminal of the on-board charging module 220 is connected to the power battery, and a second DC terminal of the on-board charging module 220 is connected to the low-voltage battery.

In the embodiment, the second control chip 120 is configured to control the on-board charging module 220, so that the external AC power supply realizes AC charging for the power battery, or the power battery realizes AC discharging to the external load through the AC charging and discharging port, or the power battery realizes charging for the low-voltage battery.

Figure 6:
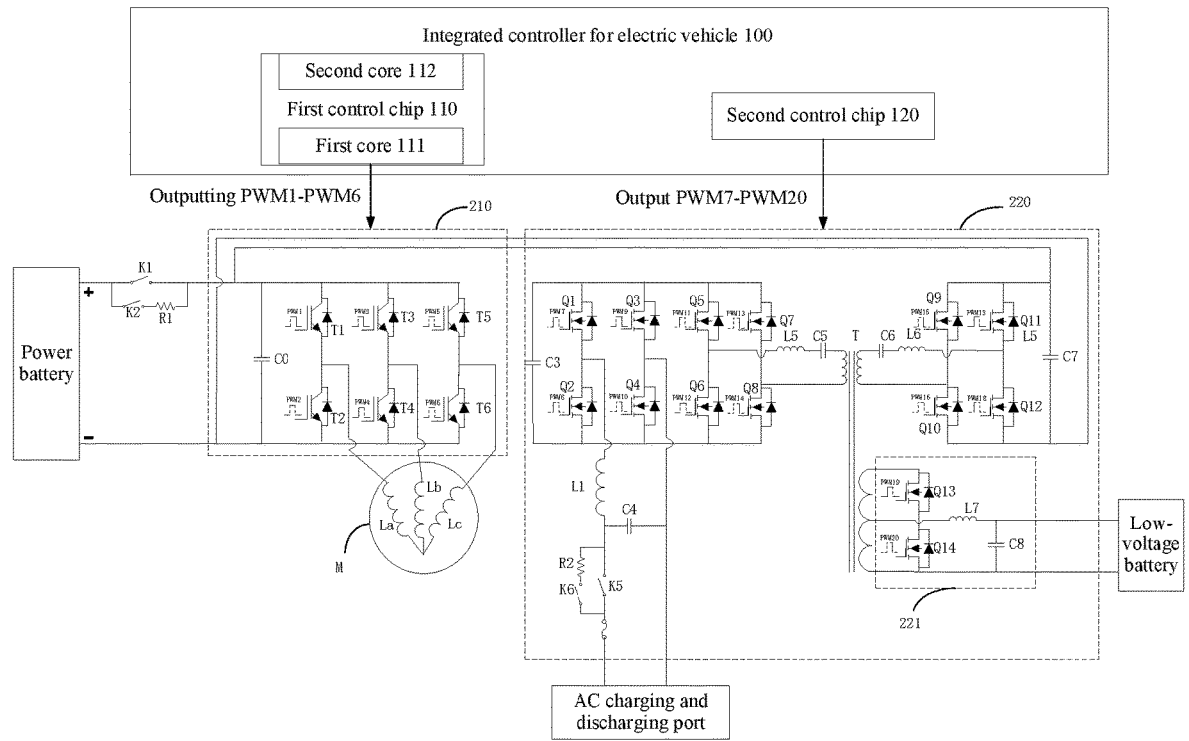
FIG. 6 is a schematic structural diagram of an integrated control system for an electric vehicle according to a first specific example of the present disclosure.

Specifically, as shown in FIG. 6, the on-board charging module 210 includes a first H bridge (composed of switch tubes Q9, Q10, Q11, and Q12), a transformer T, a second H bridge (composed of switch tubes Q5, Q6, Q7, and Q8), a third H bridge (composed of switch tubes Q1, Q2, Q3, and Q4), a first inductor L1, and a first AC/DC conversion circuit 221. A DC terminal of the first H bridge is connected to the power battery, and an AC terminal of the first H bridge is connected to a first secondary coil of the transformer T. An AC terminal of the second H bridge is connected to a primary coil of the transformer T, and a DC terminal of the second H bridge is connected to a DC terminal of the third H bridge. A midpoint of one bridge arm of the third H bridge is connected to one end of the first inductor L1, and an other end of the first inductor L1 is connected to a first port of the AC charging and discharging port. A midpoint of an other bridge arm of the third H bridge is connected to a second port of the AC charging and discharging port. A second secondary coil of the transformer T is connected to an AC terminal of the first AC/DC conversion circuit 221, and a DC terminal of the first AC/DC conversion circuit 221 is connected to the low-voltage battery. Since the AC charging and discharging module and the low-voltage battery supply module reuse one H-bridge and one transformer, required electrical elements can be reduced, thereby reducing the costs and the size and the weight of the assembly.

It should be noted that, a controllable switch and a bleeder resistor may be further connected between the power battery and the driving unit 200. The driving unit 200 further includes an LC filter circuit, a filter capacitor, a bleed resistor, and the like. For a specific connection manner thereof, refer to FIG. 6. Certainly, designers may adjust a number and connection positions of LC filter circuits, filter capacitors, and bleeder resistors according to requirements. This is not limited herein.

Figure 7:
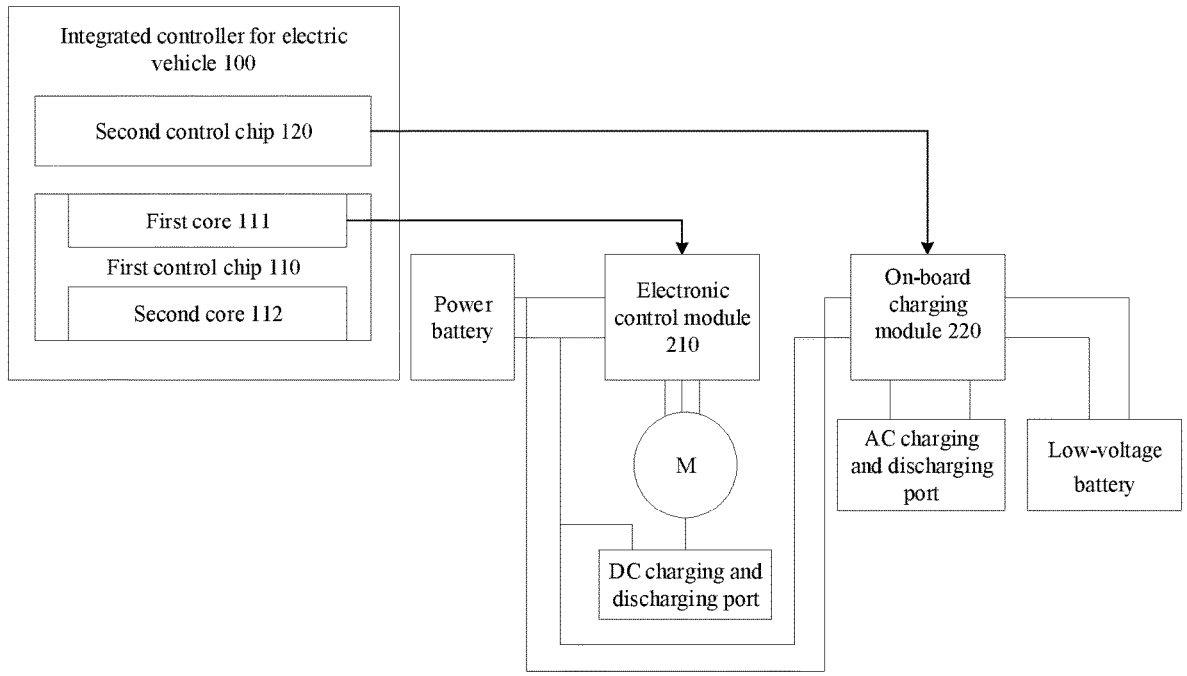
FIG. 7 is a structural block diagram of an integrated control system for an electric vehicle according to a third embodiment of the present disclosure.

In an embodiment, referring to FIG. 7, the electric vehicle further includes a DC charging and discharging port. A first port of the DC charging and discharging port is connected to a first electrode (for example, a positive electrode) of the power battery by the motor M and the electronic control module 210 successively, and a second port of the DC charging and discharging port is connected to a second electrode (for example, a negative electrode) of the power battery.

In the example, the first core 111 is configured to control the electronic control module 210 at time intervals, so that the external DC power supply realizes boost DC charging for the power battery, or the power battery realizes DC discharging to the external load through the DC charging and discharging port, or driving of the motor M is realized.

Figure 8:
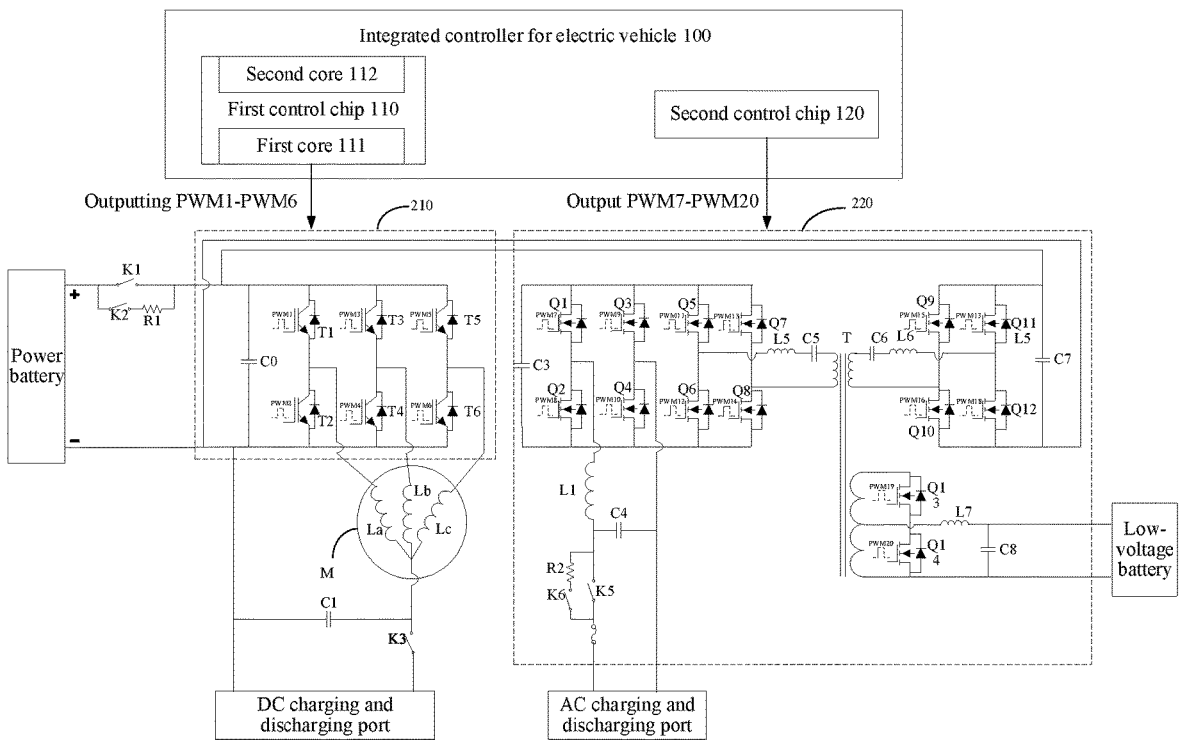
FIG. 8 is a schematic structural diagram of an integrated control system for an electric vehicle according to a second specific example of the present disclosure.

Specifically, as shown in FIG. 6 and FIG. 8, the electronic control module 210 includes a first phase bridge arm (composed of switch tubes T1 and T2 connected in series), a second phase bridge arm (composed of switch tubes T3 and T4 connected in series), and a third phase bridge arm (composed of switch tubes T5 and T6 connected in series). The first phase bridge arm, the second phase bridge arm, and the third phase bridge arm are connected in parallel to form a first bus terminal and a second bus terminal. The first bus terminal is connected to the first electrode of the power battery, and the second bus terminal is connected to the second electrode of the power battery.

Referring to FIG. 6 and FIG. 8, the motor M includes a first phase coil La, a second phase coil Lb, and a third phase coil Lc. One ends of the first phase coil La, the second phase coil Lb, and the third phase coil Lc are connected to form a star-shaped connection point. An other end of the first phase coil La is connected to a midpoint of the first phase bridge arm, an other end of the second phase coil Lb is connected to a midpoint of the second phase bridge arm, and an other end of the third phase coil Lc is connected to a midpoint of the third phase bridge arm. The star-shaped connection point is connected to the first port of the DC charging and discharging port.

In the example, when the first core 111 controls the electronic control module 210 to realize DC charging and discharging, the first core may continuously control only one of the phase bridge arms, and realize DC charging and discharging by using the phase bridge arm and the corresponding phase coil. Alternatively, the first core may alternately control two or three phase bridge arms to realize DC charging and discharging.

The bridge arm and the inductor are reused, so that required electrical elements can be reduced, thereby reducing the costs and the size and the weight of the assembly.

Figure 9:
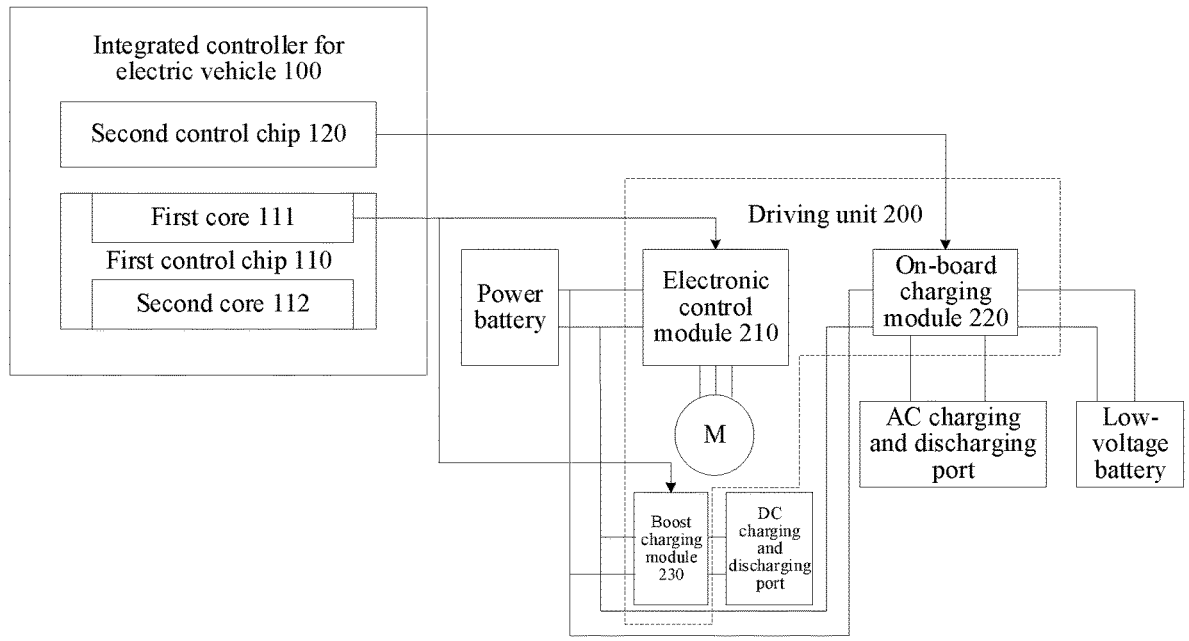
FIG. 9 is a structural block diagram of an integrated control system for an electric vehicle according to a fourth embodiment of the present disclosure.

In an embodiment, as shown in FIG. 9, the electric vehicle further includes a DC charging and discharging port, and the driving unit 200 further includes a boost charging module 230 disposed between the DC charging and discharging port and the power battery.

The first core 111 is further configured to control the boost charging module 230, so that the external DC power supply realizes boost DC charging for the power battery, or the power battery realizes DC discharging to the external load through the DC charging and discharging port.

Figure 10:
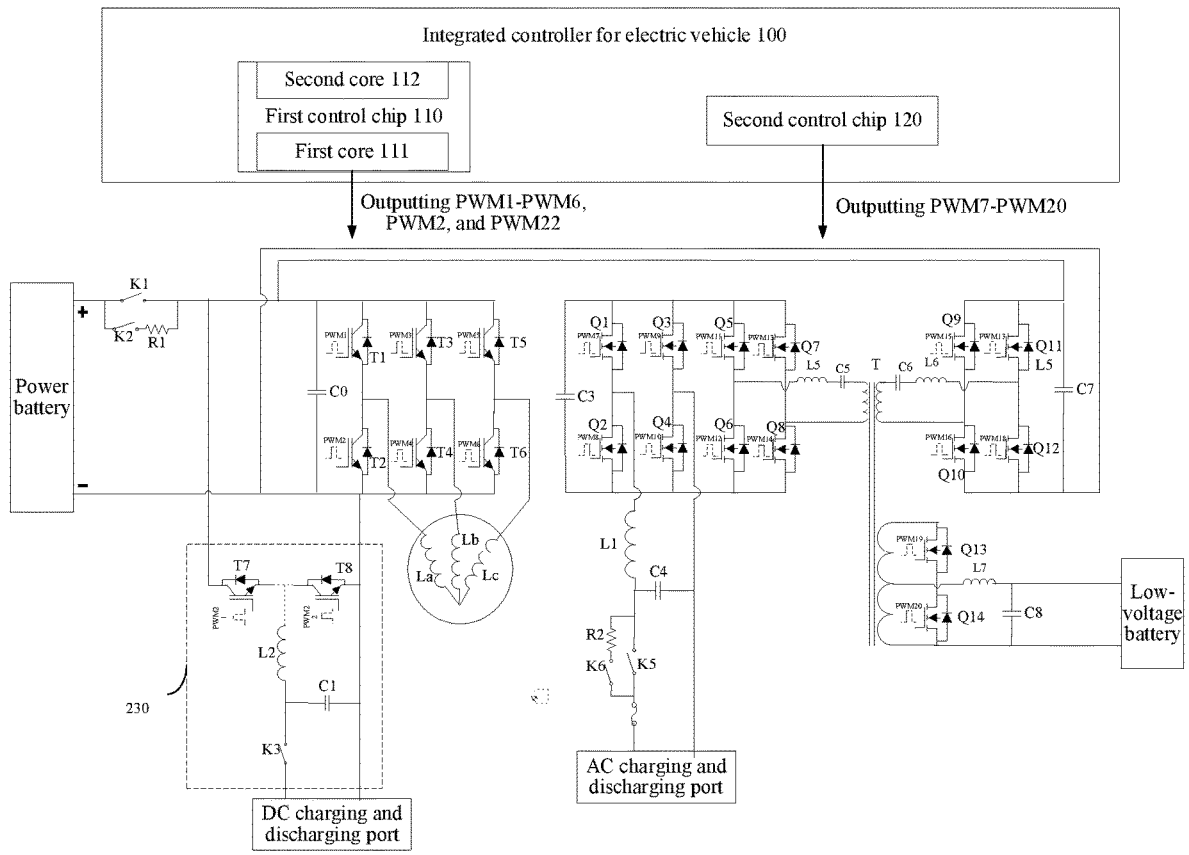
FIG. 10 is a schematic structural diagram of an integrated control system for an electric vehicle according to a third specific example of the present disclosure.

Specifically, as shown in FIG. 10, the boost charging module 230 includes a first conversion bridge arm composed of two switch tubes (that is, T7 and T8) connected in series and a second inductor L2. One end of the first conversion bridge arm is connected to a first electrode of the power battery, and an other end of the first conversion bridge arm is connected to a second electrode of the power battery. One end of the second inductor L2 is connected to a midpoint of the first conversion bridge arm, and an other end of the second inductor L2 is connected to the first port of the DC charging and discharging port. The second port of the DC charging and discharging port is connected to the second electrode of the power battery.

Figure 11:
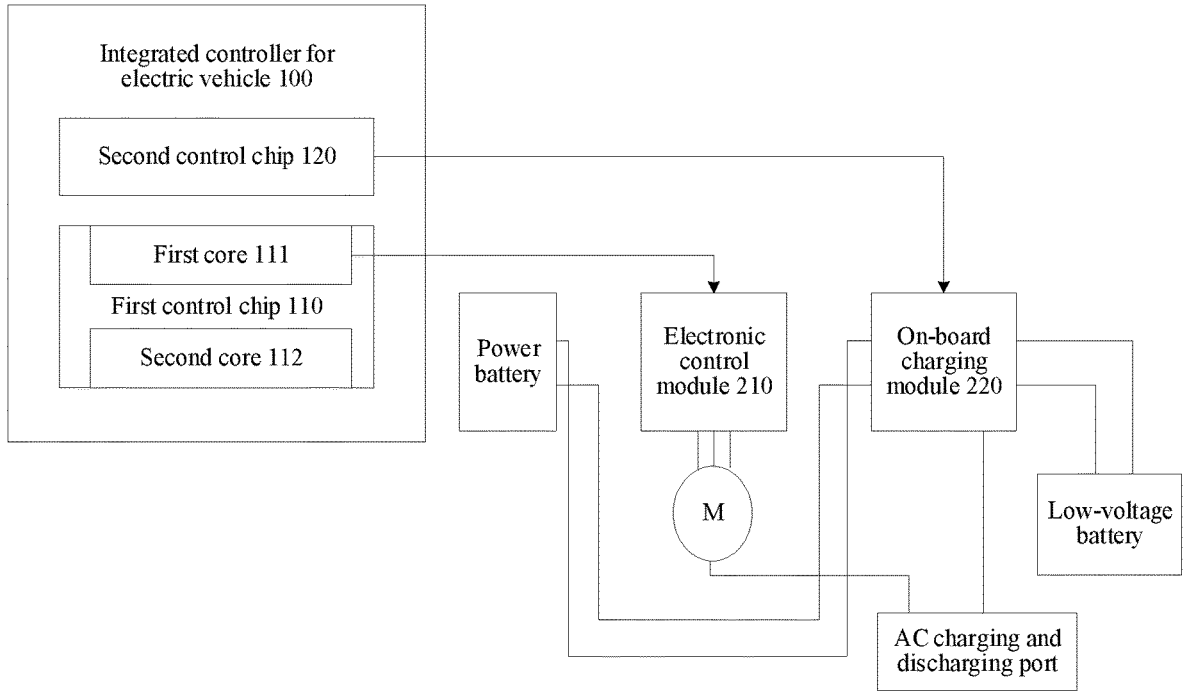
FIG. 11 is a structural block diagram of an integrated control system for an electric vehicle according to a fifth embodiment of the present disclosure.

In an embodiment, referring to FIG. 11, a first port of the AC charging and discharging port is connected to the electronic control module 210 by the motor M, a second port of the AC charging and discharging port is connected to the on-board charging module 220, and the electronic control module 210 is connected to the on-board charging module 220. The first core 111 and the second control chip 120 are configured to operate simultaneously. The first core 111 is configured to control the electronic control module 210, and the second control chip 120 is configured to control the on-board charging module 220, so that the external AC power supply realizes AC charging for the power battery, or the power battery realizes AC discharging to the external load through the AC charging and discharging port.

Figure 12:
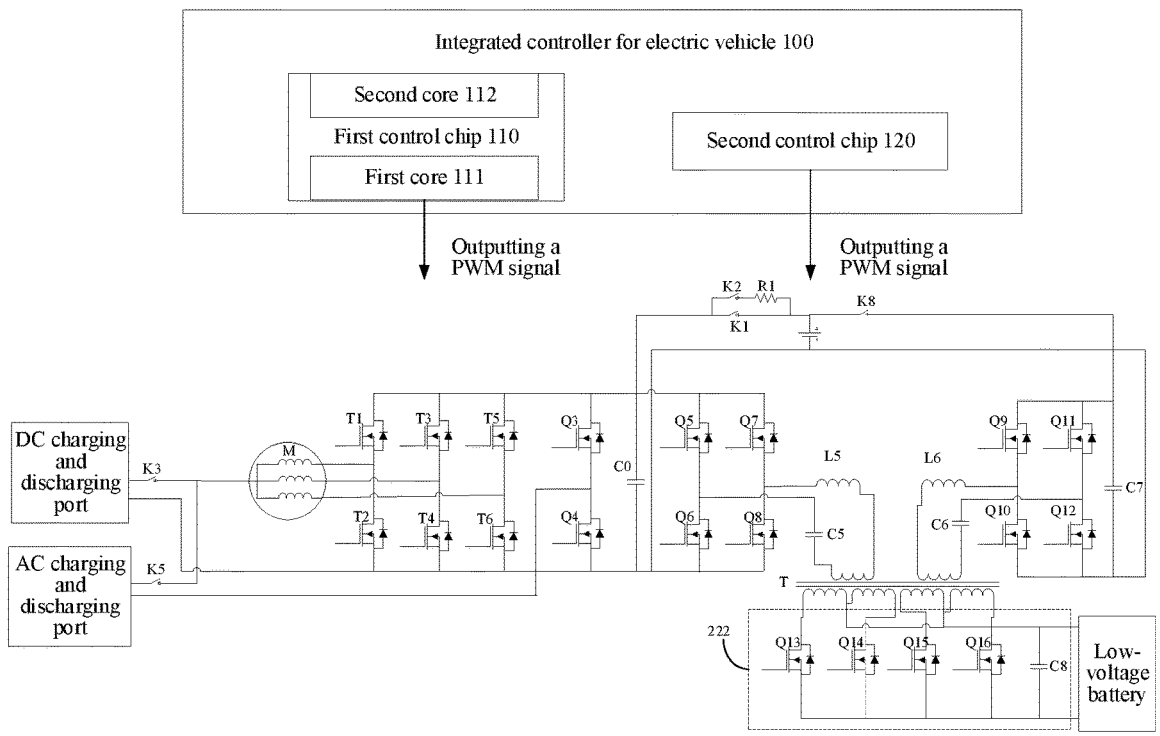
FIG. 12 is a schematic structural diagram of an integrated control system for an electric vehicle according to a fourth specific example of the present disclosure.

Specifically, as shown in FIG. 12, the on-board charging module 220 includes a first H bridge (composed of switch tubes Q9, Q10, Q11 and Q12), a transformer T, a second H bridge (composed of switch tubes Q5, Q6, Q7 and Q8), a second conversion bridge arm composed of two switch tubes (Q3 and Q4) connected in series, and a second AC/DC conversion circuit 222. A DC terminal of the first H bridge is connected to the power battery, and an AC terminal of the first H bridge is connected to a first secondary coil of the transformer T. An AC terminal of the second H bridge is connected to a primary coil of the transformer T, a first port of a DC terminal of the second H bridge is connected to one end of the second conversion bridge arm, and a second port of the DC terminal of the second H bridge is connected to an other end of the second conversion bridge arm. A midpoint of the second conversion bridge arm is connected to the second port of the AC charging and discharging port. One end of the second AC/DC conversion circuit 222 is connected to a second secondary coil of the transformer T, and an other end of the second AC/DC conversion circuit 222 is connected to the low-voltage battery.

Referring to FIG. 12, the electronic control module 210 includes a first phase bridge arm (composed of switch tubes T1 and T2 connected in series), a second phase bridge arm (composed of switch tubes T3 and T4 connected in series), and a third phase bridge arm (composed of switch tubes T5 and T6 connected in series). The first phase bridge arm, the second phase bridge arm, and the third phase bridge arm are connected in parallel to form a first bus terminal and a second bus terminal. The first bus terminal is connected to a first electrode of the power battery and one end of the second conversion bridge arm, and the second bus terminal is connected to a second electrode of the power battery and an other end of the second conversion bridge arm. The motor M includes a first phase coil La, a second phase coil Lb, and a third phase coil Lc. One ends of the first phase coil La, the second phase coil Lb, and the third phase coil Lc are connected to form a star-shaped connection point. An other end of the first phase coil La is connected to a midpoint of the first phase bridge arm, an other end of the second phase coil Lb is connected to a midpoint of the second phase bridge arm, and an other end of the third phase coil Lc is connected to a midpoint of the third phase bridge arm. The star-shaped connection point is connected to the first port of the AC charging and discharging port.

The bridge arm and the inductor are reused, so that required electrical elements can be reduced, thereby reducing the costs and the size and the weight of the assembly.

Figure 13:
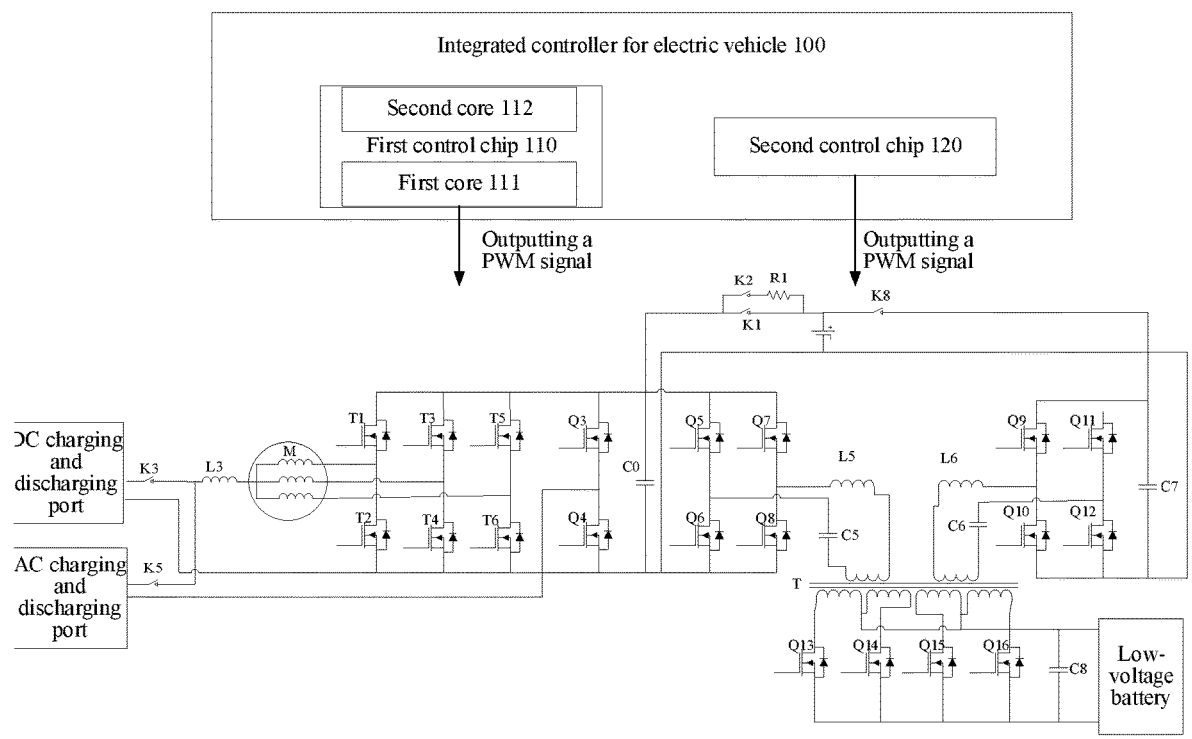
FIG. 13 is a schematic structural diagram of an integrated control system for an electric vehicle according to a fifth specific example of the present disclosure.

In an embodiment, as shown in FIG. 13, the on-board charging module 220 further includes a third inductor L3. One end of the third inductor L3 is connected to the star-shaped connection point, and an other end of the third inductor L3 is connected to the first port of the AC charging and discharging port. Since the inductance of a stator winding of the motor M is relatively small in the AC charging mode at a high frequency, by disposing the third inductor L3, the inductance can be increased and the power factor correction function can be realized more effectively.

Optionally, referring to FIG. 12 and FIG. 13, the on-board charging module 220 may further include a second AC/DC conversion circuit 222. Compared with that in FIG. 8 and FIG. 10, the second AC/DC conversion circuit 222 in FIG. 12 and FIG. 13 includes four switch tubes. By alternately controlling the four switch tubes two by two, overheating of the switch tubes is reduced or avoided. Therefore, the service life of the second AC/DC conversion circuit 222 is prolonged.

Figure 14:
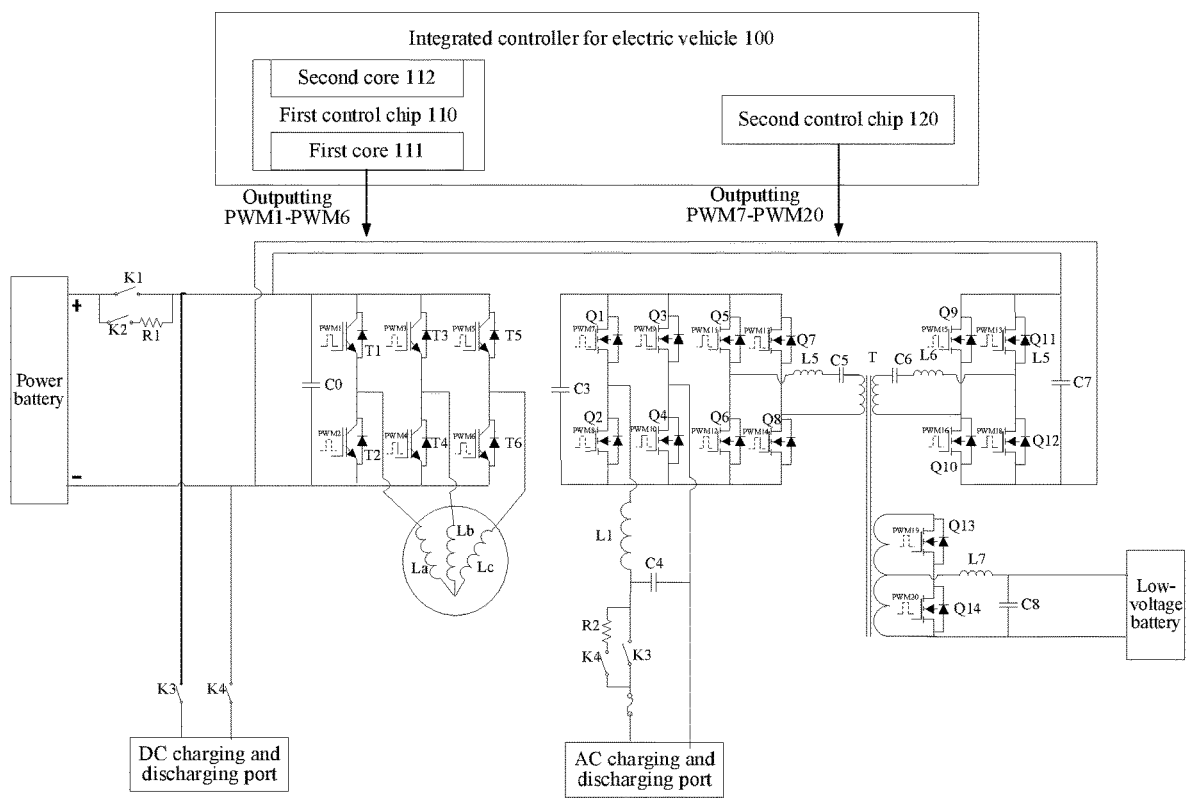
FIG. 14 is a schematic structural diagram of an integrated control system for an electric vehicle according to a sixth specific example of the present disclosure.

In an embodiment, as shown in FIG. 14, the DC charging and discharging port may be connected to the power battery by a positive contactor K3 and a negative contact K4.

Figure 15:
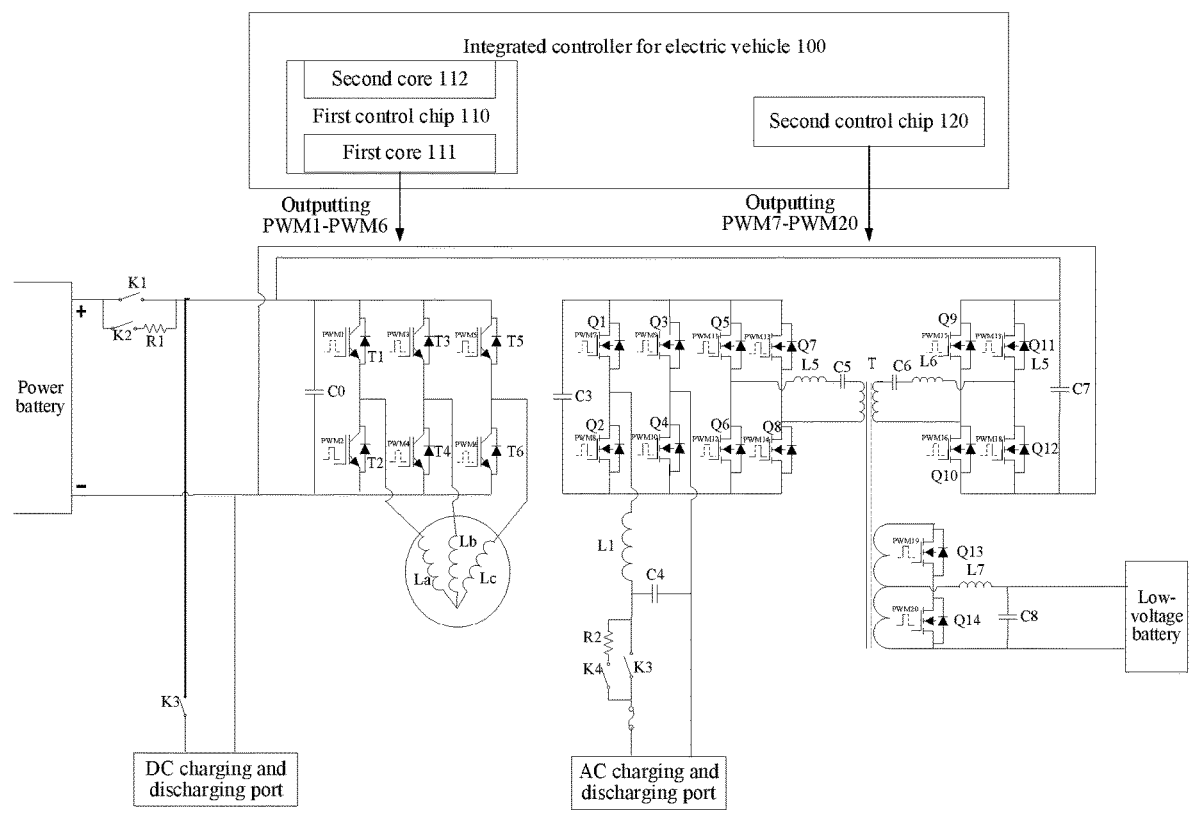
FIG. 15 is a schematic structural diagram of an integrated control system for an electric vehicle according to a seventh specific example of the present disclosure.

In an embodiment, as shown in FIG. 15, the DC charging and discharging port may be connected to the power battery by only the positive contactor K3. Certainly, the DC charging and discharging port may be connected to the power battery by only the negative contactor K4. Compared with the example shown in FIG. 14, the example shown in FIG. 15 uses fewer contactors and has lower costs.

Figure 16:
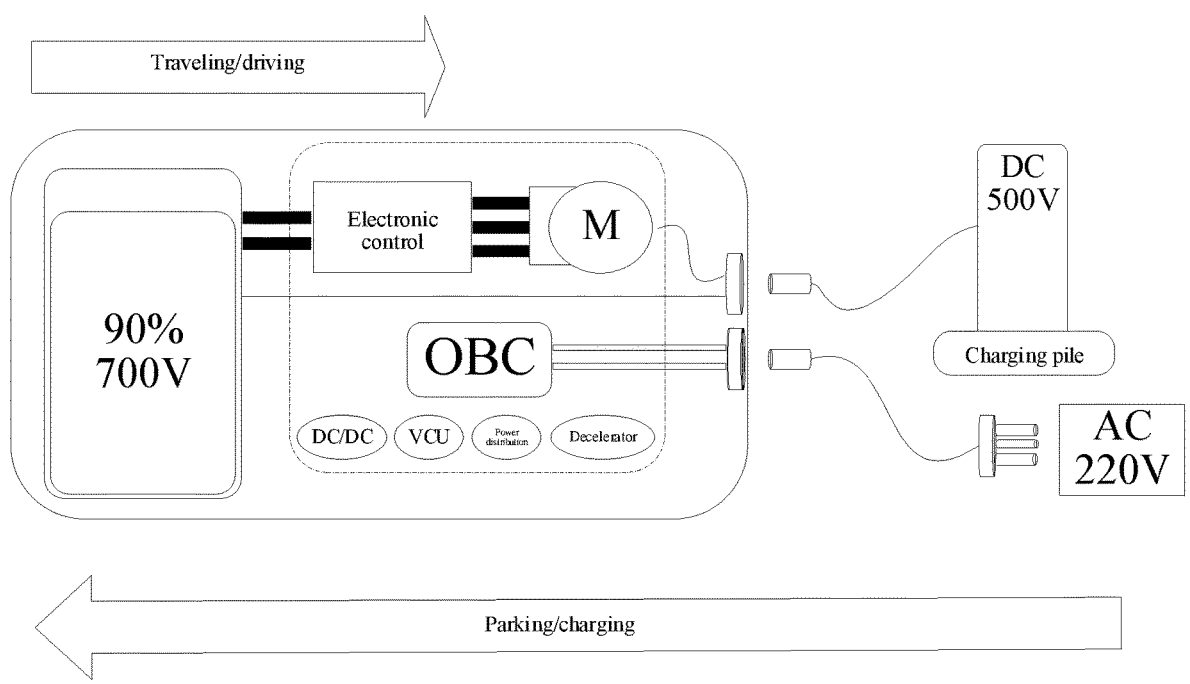
FIG. 16 is a schematic structural diagram of vehicle charging according to an example of the present disclosure.

In an embodiment of the present disclosure, as shown in FIG. 16, charging includes DC charging and AC charging. During charging, a current from a charging pile or a 220V household alternating current is converted through five-in-one to charge the power battery. During normal driving of the vehicle, the current flows from the power battery through five-in-one to the motor M to drive the vehicle to run normally.

In conclusion, according to the integrated control system for an electric vehicle in this embodiment of the present disclosure, the electrical elements are shared or reused, so that required electrical elements can be reduced, thereby reducing the costs and the size and the weight of the assembly.

Figure 17:
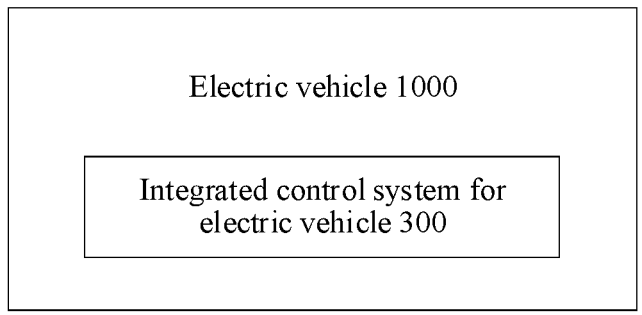
FIG. 17 is a structural block diagram of an electric vehicle according to an embodiment of the present disclosure.

FIG. 17 is a structural block diagram of an electric vehicle according to an embodiment of the present disclosure.

As shown in FIG. 17, the electric vehicle 1000 includes the integrated control system 300 for an electric vehicle in the above embodiment.

According to the electric vehicle in this embodiment of the present disclosure, the integrated control system for an electric vehicle in the above embodiment is used, and the electrical elements are shared or reused, so that required electrical elements can be reduced, thereby reducing the costs and the size and the weight of the assembly.

In the description of this specification, the description of the reference terms such as "an embodiment", "some embodiments", "exemplary embodiments", "example", "specific example", or "some examples" means that the specific features, structures, materials or characteristics described with reference to the embodiment or example are included in at least one embodiment or example of the present disclosure. In this specification, exemplary descriptions of the foregoing terms do not necessarily refer to the same embodiment or example. In addition, the described specific features, structures, materials, or characteristics may be combined in a proper manner in any one or more of the embodiments or examples.

In the description of the present disclosure, it is to be understood that the orientations or positional relationships indicated by the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc. are the orientations or positional relationships shown in the drawings, are merely to facilitate describing the present disclosure and to simplify the description, are not intended to indicate or imply that the referenced device or element must have a particular orientation, be constructed and operated in a particular orientation, and therefore are not to be construed as limiting the present disclosure.

In addition, the terms "first" and "second" are used merely for the purpose of description, and shall not be construed as indicating or implying relative importance or implying a quantity of indicated technical features. Therefore, a feature restricted by "first" or "second" may explicitly indicate or implicitly include at least one of such features. In the descriptions of the present disclosure, unless explicitly specified, "multiple" means at least two, for example, two or three.

In the present disclosure, it should be noted that unless otherwise explicitly specified and limited, the terms "mount", "connect", "connection", and "fix" should be understood in a broad sense. For example, a connection may be a fixed connection, a detachable connection, or an integral connection; or the connection may be a mechanical connection or an electrical connection; or the connection may be a direct connection, an indirect connection through an intermediary, or internal communication between two elements or mutual action relationship between two elements, unless otherwise specified explicitly. A person of ordinary skill in the art can understand specific meanings of the terms in the present disclosure based on specific situations.

In the present disclosure, unless expressly stated and defined otherwise, a first feature "on" or "beneath" a second feature may be that the first and second features are in direct contact, or that the first and second features are in indirect contact via an intermediary. In addition, that the first feature is "above", "over", or "on" the second feature may indicate that the first feature is directly above or obliquely above the second feature, or may merely indicate that the horizontal position of the first feature is higher than that of the second feature. That the first feature is "below", "under", and "beneath" the second feature may be that the first feature is right below the second feature or at an inclined bottom of the second feature, or may merely indicate that the horizontal position of the first feature is lower than that of the second feature.

Although the embodiments of the present disclosure have been shown and described above, it can be understood that, the foregoing embodiments are exemplary and should not be understood as limitation to the present disclosure. A person of ordinary skill in the art can make changes, modifications, replacements, or variations to the foregoing embodiments within the scope of the present disclosure.

What is claimed is:

1. An integrated controller for an electric vehicle, wherein the electric vehicle comprises a power battery, a low-voltage battery, and an alternating current (AC) charging and discharging port, and the integrated controller comprises:
   a first control chip, comprising a first core and a second core, wherein the first core is configured to control an electronic control circuit to drive a motor, and the second core is used as a vehicle controller; and
   a second control chip, configured to control an on-board charging circuit, so that an external AC power supply realizes AC charging for the power battery, or the power battery realizes AC discharging to an external load through the AC charging and discharging port;
   wherein the on-board charging circuit comprises (1) an AC charging and discharging circuit connected to the AC charging and discharging port for realizing charging and discharging the power battery, and (2) a low-voltage battery supply circuit connected to the low-voltage battery to enable the power battery to charge the low-voltage battery,
   wherein the AC charging and discharging circuit and the low-voltage battery supply circuit share a first H bridge and a transformer.

2. The integrated controller for the electric vehicle according to claim 1,
   wherein the integrated controller further comprises a first driving circuit and a second driving circuit,
   wherein the first driving circuit is connected to the first control chip, the second driving circuit is connected to the second control chip, and the first control chip, the second control chip, the first driving circuit, and the second driving circuit share a power controller, and
   wherein the first driving circuit is configured to drive the electronic control circuit, and the second driving circuit is configured to drive the on-board charging circuit.

3. The integrated controller for the electric vehicle according to claim 2,
   wherein the power controller comprises a power supply, a first voltage conversion circuit, a second voltage conversion circuit, a first power supply circuit, a second power supply circuit, a first isolation circuit, and a second isolation circuit, and
   wherein the power supply is connected to the first voltage conversion circuit, the second voltage conversion circuit, the first isolation circuit, and the second isolation circuit, the first voltage conversion circuit is connected to the first power supply circuit, the second power supply circuit, and the first driving circuit, the first isolation circuit is connected to the first driving circuit, the second voltage conversion circuit is connected to the second driving circuit, the second isolation circuit is connected to the second driving circuit, the first power supply circuit is connected to the first control chip, and the second power supply circuit is connected to the second control chip.

4. The integrated controller for the electric vehicle according to claim 1,
wherein the integrated controller further comprises an analog signal collection interface,
wherein the first control chip and the second control chip are both connected to the analog signal collection interface, and
wherein an analog signal comprises one or more of a throttle signal, a brake signal, an atmospheric pressure signal, a vacuum pressure signal, a current signal, a voltage signal, or temperature information.

5. The integrated controller for the electric vehicle according to claim 1,
wherein the electric vehicle further comprises a direct current (DC) charging and discharging port, and
wherein the first core is further configured to control the electronic control circuit, so that an external DC power supply realizes boost DC charging for the power battery, or the power battery realizes DC discharging to the external load through the DC charging and discharging port.

6. The integrated controller for the electric vehicle according to claim 1,
wherein the electric vehicle further comprises a direct current (DC) charging and discharging port,
wherein a boost charging circuit is disposed between the DC charging and discharging port and the power battery, and
wherein the first core is further configured to control the boost charging circuit, so that an external DC power supply realizes boost DC charging for the power battery, or the power battery realizes DC discharging to the external load through the DC charging and discharging port.

7. The integrated controller for the electric vehicle according to claim 1, wherein
the first core and the second control chip are configured to operate simultaneously,
the first core is configured to control the electronic control circuit, and
the second control chip is configured to control the on-board charging circuit, so that the external AC power supply realizes AC charging for the power battery, or the power battery realizes AC discharging to the external load through the AC charging and discharging port.

8. The integrated controller for the electric vehicle according to claim 1,
wherein the integrated controller further comprises a switch quantity signal collection interface and a motor information collection interface connected to the first control chip, and
wherein the first core and the second core share a switch quantity signal collected by the switch quantity signal collection interface and motor position information collected by the motor information collection interface.

9. An integrated control system for an electric vehicle, wherein the electric vehicle comprises a power battery, a low-voltage battery, and an alternating current (AC) charging and discharging port, and the integrated control system comprises:
an integrated controller for the electric vehicle, wherein the integrated controller comprises a first control chip and a second control chip, and the first control chip comprises a first core and a second core; and
a driving controller, comprising an electronic control circuit, a motor, and an on-board charging circuit, wherein the first core is configured to control the electronic control circuit to drive the motor, the second core is used as a vehicle controller, and the second control chip is configured to control the on-board charging circuit, so that an external AC power supply realizes AC charging for the power battery, or the power battery realizes AC discharging to an external load through the AC charging and discharging port;
wherein the on-board charging circuit comprises (1) an AC charging and discharging circuit connected to the AC charging and dischargine port for realizing charging and discharging the power battery, and (2) a low-voltage battery supply circuit connected to the low-voltage battery to enable the power battery to charge the low-voltage battery,
wherein the AC charging and discharging circuit and the low-voltage battery supply circuit share a first H bridge and a transformer.

10. The integrated control system for the electric vehicle according to claim 9,
wherein the second control chip is further configured to control the on-board charging circuit, so that the power battery realizes charging for the low-voltage battery.

11. The integrated control system for the electric vehicle according to claim 10,
wherein an AC terminal of the on-board charging circuit is connected to the AC charging and discharging port, a first direct current (DC) terminal of the on-board charging circuit is connected to the power battery, and a second DC terminal of the on-board charging circuit is connected to the low-voltage battery, and
wherein the second control chip is configured to control the on-board charging circuit, so that the external AC power supply realizes AC charging for the power battery, or the power battery realizes AC discharging to the external load through the AC charging and discharging port, or the power battery realizes charging for the low-voltage battery.

12. The integrated control system for the electric vehicle according to claim 11,
wherein the on-board charging circuit comprises a second H bridge, a third H bridge, a first inductor, and a first AC/DC conversion circuit, and
wherein a DC terminal of the first H bridge is connected to the power battery, an AC terminal of the first H bridge is connected to a first secondary coil of the transformer, an AC terminal of the second H bridge is connected to a primary coil of the transformer, a DC terminal of the second H bridge is connected to a DC terminal of the third H bridge, a midpoint of one bridge arm of the third H bridge is connected to one end of the first inductor, another end of the first inductor is connected to a first port of the AC charging and discharging port, a midpoint of another bridge arm of the third H bridge is connected to a second port of the AC charging and discharging port, a second secondary coil of the transformer is connected to an AC terminal of the first AC/DC conversion circuit, and a DC terminal of the first AC/DC conversion circuit is connected to the low-voltage battery.

13. The integrated control system for the electric vehicle according to claim 9,
wherein the electric vehicle further comprises a direct current (DC) charging and discharging port,
wherein a first port of the DC charging and discharging port is connected to a first electrode of the power battery by the motor and the electronic control circuit successively, and a second port of the DC charging and discharging port is connected to a second electrode of the power battery, and
wherein the first core is configured to control the electronic control circuit at time intervals, so that an external DC power supply realizes boost DC charging for the power battery, or the power battery realizes DC discharging to the external load through the DC charging and discharging port, or driving of the motor is realized.

14. The integrated control system for the electric vehicle according to claim 13,
wherein the electronic control circuit comprises a first phase bridge arm, a second phase bridge arm, and a third phase bridge arm, the first phase bridge arm, the second phase bridge arm, and the third phase bridge arm are connected in parallel to form a first bus terminal and a second bus terminal, the first bus terminal is connected to the first electrode of the power battery, and the second bus terminal is connected to the second electrode of the power battery; and
wherein the motor comprises a first phase coil, a second phase coil, and a third phase coil, wherein one ends of the first phase coil, the second phase coil, and the third phase coil are connected to form a star-shaped connection point, another end of the first phase coil is connected to a midpoint of the first phase bridge arm, another end of the second phase coil is connected to a midpoint of the second phase bridge arm, another end of the third phase coil is connected to a midpoint of the third phase bridge arm, and the star-shaped connection point is connected to the first port of the DC charging and discharging port.

15. The integrated control system for the electric vehicle according to claim 9,
wherein the electric vehicle further comprises a direct current (DC) charging and discharging port, and the driving controller further comprises a boost charging circuit disposed between the DC charging and discharging port and the power battery, and
wherein the first core is further configured to control the boost charging circuit, so that an external DC power supply realizes boost DC charging for the power battery, or the power battery realizes DC discharging to the external load through the DC charging and discharging port.

16. The integrated control system for the electric vehicle according to claim 15, wherein the boost charging circuit comprises:
a first conversion bridge arm composed of two switch tubes connected in series, wherein one end of the first conversion bridge arm is connected to a first electrode of the power battery, and another end of the first conversion bridge arm is connected to a second electrode of the power battery; and
a second inductor, wherein one end of the second inductor is connected to a midpoint of the first conversion bridge arm, and another end of the second inductor is connected to the first port of the DC charging and discharging port, wherein the second port of the DC charging and discharging port is connected to the second electrode of the power battery.

17. The integrated control system for the electric vehicle according to claim 9,
wherein a first port of the AC charging and discharging port is connected to the electronic control circuit by the motor, a second port of the AC charging and discharging port is connected to the on-board charging circuit, and the electronic control circuit is connected to the on-board charging circuit, and
wherein the first core and the second control chip are configured to operate simultaneously, the first core is configured to control the electronic control circuit, and the second control chip is configured to control the on-board charging circuit, so that the external AC power supply realizes AC charging for the power battery, or the power battery realizes AC discharging to the external load through the AC charging and discharging port.

18. The integrated control system for the electric vehicle according to claim 17, wherein
the on-board charging circuit comprises a second H bridge, a second conversion bridge arm composed of two switch tubes connected in series, and a second AC/DC conversion circuit, and wherein a direct current (DC) terminal of the first H bridge is connected to the power battery, an AC terminal of the first H bridge is connected to a first secondary coil of the transformer, an AC terminal of the second H bridge is connected to a primary coil of the transformer, a first port of a DC terminal of the second H bridge is connected to one end of the second conversion bridge arm, a second port of the DC terminal of the second H bridge is connected to another end of the second conversion bridge arm, a midpoint of the second conversion bridge arm is connected to the second port of the AC charging and discharging port, one end of the second AC/DC conversion circuit is connected to a second secondary coil of the transformer, and another end of the second AC/DC conversion circuit is connected to the low-voltage battery;
the electronic control circuit comprises a first phase bridge arm, a second phase bridge arm, and a third phase bridge arm, wherein the first phase bridge arm, the second phase bridge arm, and the third phase bridge arm are connected in parallel to form a first bus terminal and a second bus terminal, and wherein the first bus terminal is connected to a first electrode of the power battery and one end of the second conversion bridge arm, and the second bus terminal is connected to a second electrode of the power battery and another end of the second conversion bridge arm; and
the motor comprises a first phase coil, a second phase coil, and a third phase coil, wherein one ends of the first phase coil, the second phase coil, and the third phase coil are connected to form a star-shaped connection point, one end of the first phase coil is connected to a midpoint of the first phase bridge arm, one end of the second phase coil is connected to a midpoint of the second phase bridge arm, and one end of the third phase coil is connected to a midpoint of the third phase bridge arm, wherein the star-shaped connection point is connected to the first port of the AC charging and discharging port.

19. The integrated control system for the electric vehicle according to claim 18, wherein the on-board charging circuit further comprises a third inductor, and wherein one end of the third inductor is connected to the star-shaped connection point, and another end of the third inductor is connected to the first port of the AC charging and discharging port.

20. An electric vehicle, comprising an integrated control system for the electric vehicle, wherein the electric vehicle comprises a power battery, a low-voltage battery, and an alternating current (AC) charging and discharging port, and the integrated controller system comprises:
    an integrated controller for the electric vehicle, wherein the integrated controller comprises a first control chip and a second control chip, and the first control chip comprises a first core and a second core; and
    a driving controller, comprising an electronic control circuit, a motor, and an on-board charging circuit, wherein the first core is configured to control the electronic control circuit to drive the motor, the second core is used as a vehicle controller, and the second control chip is configured to control the on-board charging circuit, so that an external AC power supply realizes AC charging for the power battery, or the power battery realizes AC discharging to an external load through the AC charging and discharging port;
    wherein the on-board charging circuit comprises (1) an AC charging and discharging circuit connected to the AC charging and discharging port for realizing charging and discharging the power battery, and (2) a low-voltage battery supply circuit connected to the low-voltage battery to enable the power battery to charge the low-voltage battery,
    wherein the AC charging and discharging circuit and the low-voltage battery supply circuit share a first H bridge and a transformer.

\* \* \* \* \*